(12) United States Patent
Onural

(10) Patent No.: US 10,409,221 B2
(45) Date of Patent: Sep. 10, 2019

(54) WIDE VIEWING ANGLE HOLOGRAPHIC VIDEO CAMERA AND DISPLAY USING A PHASE PLATE

(71) Applicant: Levent Onural, Ankara (TR)

(72) Inventor: Levent Onural, Ankara (TR)

( * ) Notice: Subject to any disclaimer, the term of this patent is extended or adjusted under 35 U.S.C. 154(b) by 317 days.

(21) Appl. No.: 14/902,384

(22) PCT Filed: Jul. 7, 2015

(86) PCT No.: PCT/TR2015/000282
§ 371 (c)(1),
(2) Date: Dec. 31, 2015

(87) PCT Pub. No.: WO2017/007432
PCT Pub. Date: Jan. 12, 2017

(65) Prior Publication Data
US 2017/0168453 A1 Jun. 15, 2017

(51) Int. Cl.
*G03H 1/04* (2006.01)
*G03H 1/22* (2006.01)

(52) U.S. Cl.
CPC ........... *G03H 1/2294* (2013.01); *G03H 1/041* (2013.01); *G03H 1/0443* (2013.01);
(Continued)

(58) Field of Classification Search
CPC .......... G03H 1/08; G03H 1/22; G03H 1/0808; G03H 1/26; G03H 1/2294; G03H 1/0465; G03H 1/0443; G03H 1/041; G03H 1/2286; G03H 1/2205; G03H 2223/23; G03H 2226/11; G03H 2226/02; G03H 2001/0436; G03H 2223/12; G03H 2225/61; G03H 2222/34; G03H 2225/35; G03H 2001/0452; G03H 2222/54; G03H 2001/221; G03H 2001/0447; G03H 1/0841; G03H 2001/0816; G03H 2001/0825; G03H 2001/0833; G03H 2001/085;
(Continued)

(56) References Cited

U.S. PATENT DOCUMENTS 5,602,679 A * 2/1997 Dolgoff ............. G02F 1/133382
345/32
6,466,372 B1 * 10/2002 Morris ................. G03H 1/22
359/11

(Continued)

OTHER PUBLICATIONS

Benzie, P., et al., "A Survey of 3DTV Displays: Techniques and Technologies", IEEE Transactions on Circuits and Systems for Video Technology, vol. 17. No. 11, Nov. 2007, pp. 1647-1658.
(Continued)

*Primary Examiner* — William R Alexander
*Assistant Examiner* — Henry A Duong
(74) *Attorney, Agent, or Firm* — Ladas & Parry LLP

(57) ABSTRACT

The present invention relates to a system and method for displaying and capturing holographic true 3D images. The system comprises elements which may form both a wide viewing angle holographic true 3D display and a holographic true 3D video camera. The system mainly comprises a light source, a spatial light modulator or an electro-optical capturing device in different embodiments of the invention, a phase plate, a computer and an opaque mask in some embodiments of the invention.

11 Claims, 9 Drawing Sheets

(52) U.S. Cl.
CPC ......... *G03H 1/0465* (2013.01); *G03H 1/2205* (2013.01); *G03H 1/2286* (2013.01); *G03H 2001/0436* (2013.01); *G03H 2001/0447* (2013.01); *G03H 2001/0452* (2013.01); *G03H 2001/221* (2013.01); *G03H 2222/34* (2013.01); *G03H 2222/54* (2013.01); *G03H 2223/12* (2013.01); *G03H 2223/23* (2013.01); *G03H 2225/35* (2013.01); *G03H 2225/61* (2013.01); *G03H 2226/02* (2013.01); *G03H 2226/11* (2013.01)

(58) Field of Classification Search
CPC ....... G03H 2001/0858; G03H 2210/40; G03H 2210/44; G03H 2210/441; G03H 2210/45
USPC .......................................................... 359/9
See application file for complete search history.

(56) References Cited

U.S. PATENT DOCUMENTS

| | | | | |
|---|---|---|---|---|
| 2006/0187297 | A1* | 8/2006 | Onural | G03H 1/0005 348/40 |
| 2008/0018808 | A1* | 1/2008 | Seki | G03B 5/00 348/751 |
| 2012/0044320 | A1 | 2/2012 | Spivey et al. | |
| 2012/0224062 | A1* | 9/2012 | Lacoste | G01C 21/365 348/148 |
| 2013/0335795 | A1* | 12/2013 | Song | G03H 1/2294 359/9 |
| 2014/0210960 | A1* | 7/2014 | Sung | G02F 1/133504 348/51 |
| 2014/0300695 | A1* | 10/2014 | Smalley | G02F 1/011 348/40 |
| 2015/0085331 | A1 | 3/2015 | Chae | |
| 2015/0160614 | A1* | 6/2015 | Sung | G03H 1/2294 359/9 |

OTHER PUBLICATIONS

Onural, L, et al., "Digital Holographic Three-Dimensional Video Displays", Proceedings of the IEEE, vol. 99, No. 4, Apr. 2011, pp. 576-589.

International Search Report dated Oct. 14, 2015 for Application No. PCT/TR2015/000282.

Yaras, F., et al., "State of the Art in Holographic Displays: A Survey", Journal of Display Technology, vol. 6, No. 10, Oct. 2010, pp. 443-454.

Ulusoy, Erdem, et al, Full-complex amplitude modulation with binary spatial light modulators. J. Opt. Soc. Am. A, vol. 28, No. 11, pp. 2310-2321, Nov. 2011.

* cited by examiner

WIDE VIEWING ANGLE HOLOGRAPHIC VIDEO CAMERA AND DISPLAY USING A PHASE PLATE

CROSS-REFERENCE TO RELATED APPLICATION

This U.S. application claims priority under 35 U.S.C 371 to, and is a U.S. National Phase application of, the International Patent Application No. PCT/TR2015/000282, filed 7 Jul. 2015, the disclosures of which are incorporated in their entirety by reference herein.

FIELD OF THE INVENTION

The present invention relates to a system and method for displaying and capturing holographic true 3D images. The system comprises elements which may form both a wide viewing angle holographic true 3D display and a holographic true 3D video camera.

BACKGROUND OF THE INVENTION

True 3D video displays target physical duplication of volume filling light of a scene. If a perfect duplication can be achieved, any observer, human or not, interacting with the duplicate light will see an exact ghost-like duplicate of the original scene. Most of the techniques commonly used today for 3D video are based on stereoscopic technique, as in commercial 3D movies. Even though multi-view video techniques are better than stereoscopy, these techniques are still far from ideal true 3D. The only true 3D technique is the holography. An overview of different 3D display techniques can be found in P. Benzie, J. Watson, P. Surman, I. Rakkolainen, K. Hopf, H. Urey, V. Sainov and C. von Kopylow, "A Survey of 3DTV Displays: Techniques and Technologies", IEEE Tran. on Circuits and Systems for Video Technology, vol 17, no 11, pp 1647-1658, November 2007. A survey on existing holographic displays can be found in F. Yaraş, H. Kang and L. Onural, "State of the Art in Holographic Displays: A Survey", J. of Display Technology, vol 6, no 10, pp 443-454, October 2010. One of the major problems of the state-of-the art electro-holographic video cameras or displays is the required high spatial bandwidth (resolution) of the underlying electro-optical device. Holographic patterns are typically complicated fringe patterns where the fringes have very fine details; the detail is in the order of the wavelength and therefore, is in the micrometer range for optical holography. In addition to the high spatial bandwidth, a rather large size, ranging from a few square centimeters to many square decimeters, is needed for a satisfactory viewing experience. Such a fine resolution over a rather large area means a very large space-bandwidth product. Therefore, for a digital display, the device on which the holograms are electronically written must have very small pixel sizes (in the order of micrometers) that in turn, brings the number of such pixels to the order millions per square millimeter of the device. The same is also true for the camera: the electro-optical capturing device that captures the holographic fringe pattern must have a high spatial bandwidth (resolution) and a very large space-bandwidth product. The difficulty in the design and manufacturing of such high-resolution display or capture devices is one of the main obstacles that prevent consumer quality holographic video displays. The effect of the resolution on the display is one of the important issues to consider and it can be analyzed as given in L. Onural, F. Yaraş and H. Kang, "Digital Holographic Three-Dimensional Video Displays", Proc. of the IEEE, vol 99, no 4, pp 576-589, April 2011. Simply, each small patch on the display device is a local diffractor that distributes the incident light to different directions as it passes (transmissive case) or reflects (reflective case) from that patch. The resolution is directly related to the diffraction angle: larger resolutions result in finer patterns which in turn result in larger diffraction angles; therefore, a large resolution is needed to distribute outgoing light within a larger angle. The size of this angle also determines the viewing angle of the observer. The same is also true for capture devices: larger angles of incidence results in high resolution fringes to capture. Therefore, the resolution, both at the display or the capture, is directly related to viewing and capturing angles.

A curved mirror based holographic display device which overcomes the abovementioned difficulties associated with high resolution (wide viewing angle) requirement problem is disclosed in a prior patent application by L. Onural which has been filed on Dec. 8, 2014 and has the application number "PCT/TR2014/000492" and the title of "A System and Method for Displaying and Capturing Holographic True 3D Images".

The invention disclosed here in this document, is another solution to the same problem. Now a phase plate which has a specified pattern of groves on it is used instead of the curved mirror. As a consequence, the size and the geometry is significantly simplified.

An example of a holographic 3D image display, which utilizes a diffraction grating sandwiched between lens arrays to effectively yield a complex valued spatial light modulation, is disclosed in worldwide patent WO2013/187704. Accordingly, the phase and the amplitude of light may be modulated simultaneously. The modulator may further comprise a phase plate and a polarizing plate which are disposed between the spatial light modulator and the first lens array.

OBJECTS AND SUMMARY OF THE INVENTION

The object of the invention is to provide a system and a method to overcome the problem of high-resolution requirement to achieve wider diffraction angles, by incorporating a phase plate. As a consequence of the geometry and the specific phase pattern obtained by the groves on the plate, large capture and viewing angles are made possible even if a rather low resolution capture or display device is used.

The invention provides a system which may be used for both displaying and capturing holographic true 3D images. The display and camera models of the system are reciprocal models; therefore, description of one of them is also valid for the other one, provided that the direction of the flow of the light is reversed.

The invention also provides a method which is for writing fringe patterns on a spatial light modulator of a system which is used for displaying holographic true 3D images. As will be apparent to one of skill in the art, the operations disclosed herein may be implemented in a number of ways, and such changes and modifications may be made without departing from this invention and its broader aspects. Other aspects, features, and advantages of embodiments of the present invention, as defined solely by the claims, will become apparent in the non-limiting and detailed description set forth below.

DETAILED DESCRIPTION OF THE INVENTION

The following sets forth a detailed description of the best-contemplated mode for carrying out the invention. The description is intended to be illustrative of the invention and should not be taken to be limiting. "Wide Viewing Angle Holographic Video Camera and Display Using a Phase Plate" realized in order to fulfill the objects of the present invention is illustrated in the attached figures, where:

FIG. 1a, FIG. 1b, FIG. 1c and FIG. 1d show the top and side views of a holographic true 3D display in accordance with an embodiment of the invention in which the spatial light modulator is a transmissive spatial light modulator. FIG. 1a shows a circular base geometry, whereas FIG. 1b displays a rectangular base geometry. Other base geometries are also feasible. FIG. 1c displays an embodiment of the invention wherein a single spatial light modulator is used as SLM. FIG. 1d displays an embodiment of the invention wherein the spatial light modulator comprises an array of smaller spatial light modulators. The order of the phase plate and the SLM can be interchanged in different embodiments of the invention.

FIG. 2 shows the side view of a holographic true 3D display in accordance with an embodiment of the invention in which the spatial light modulator is a reflective spatial light modulator.

FIG. 3a and FIG. 3b both show a cross-sectional view of a holographic true 3D video display in accordance with an embodiment of the invention where the two layers do not touch each other, but there is a separation between them for a transmissive SLM. The order of the layers may be interchanged as shown in FIGS. 3a and 3b. There could also be a separation between the two layers also for the reflective SLM case.

Figure 1A:
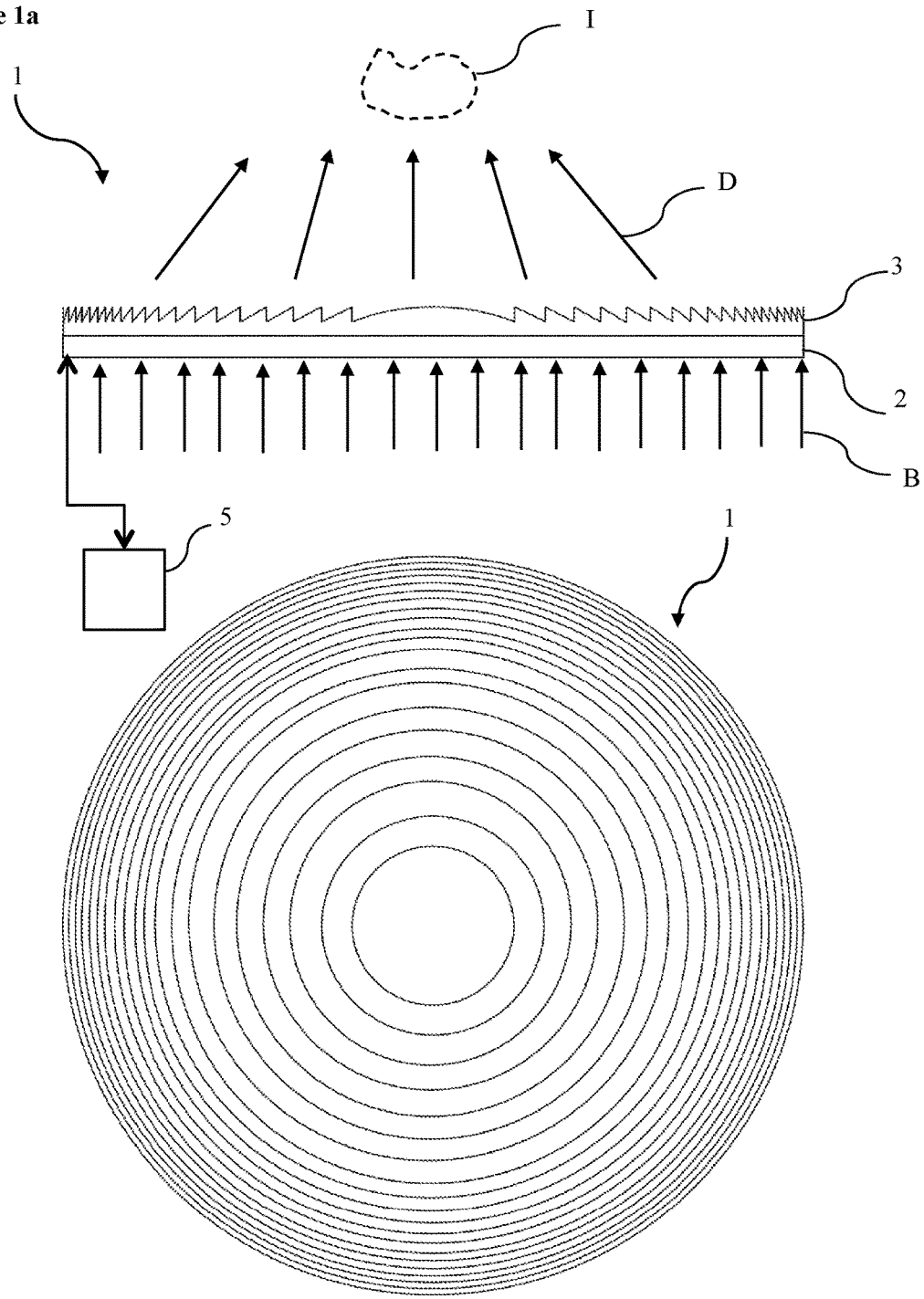
Figure 1B:
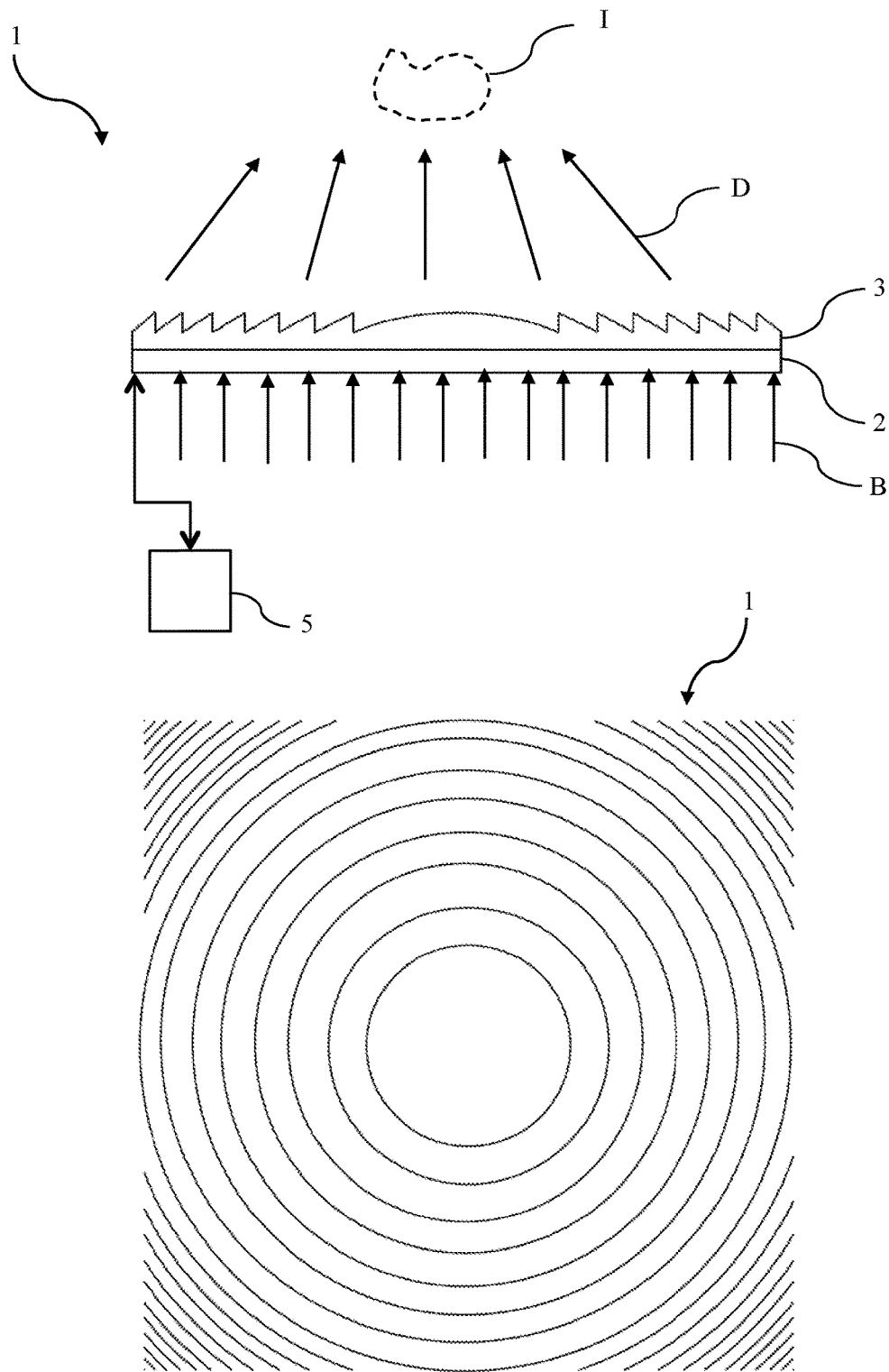
Figure 1C:
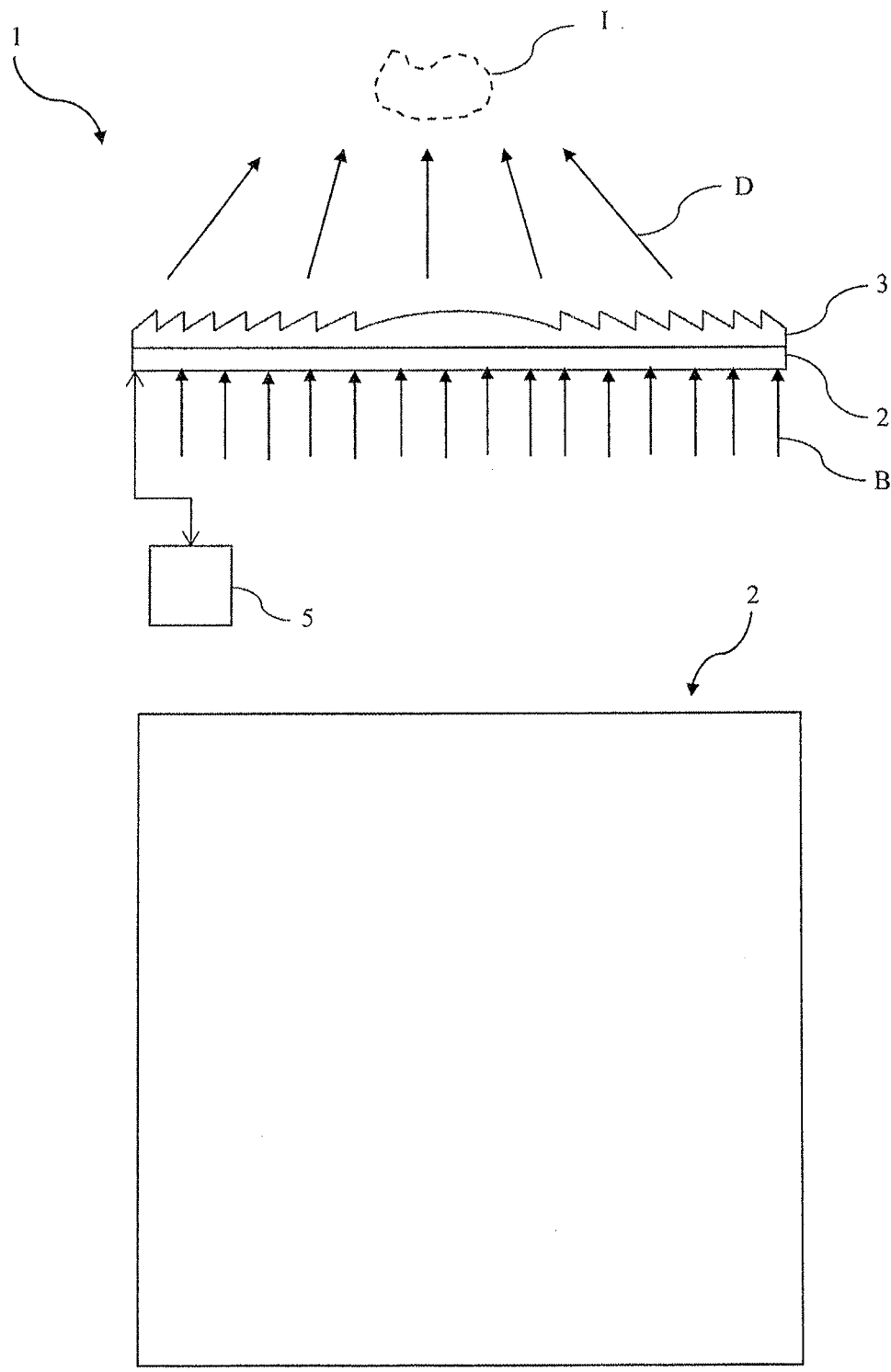
Figure 1D:
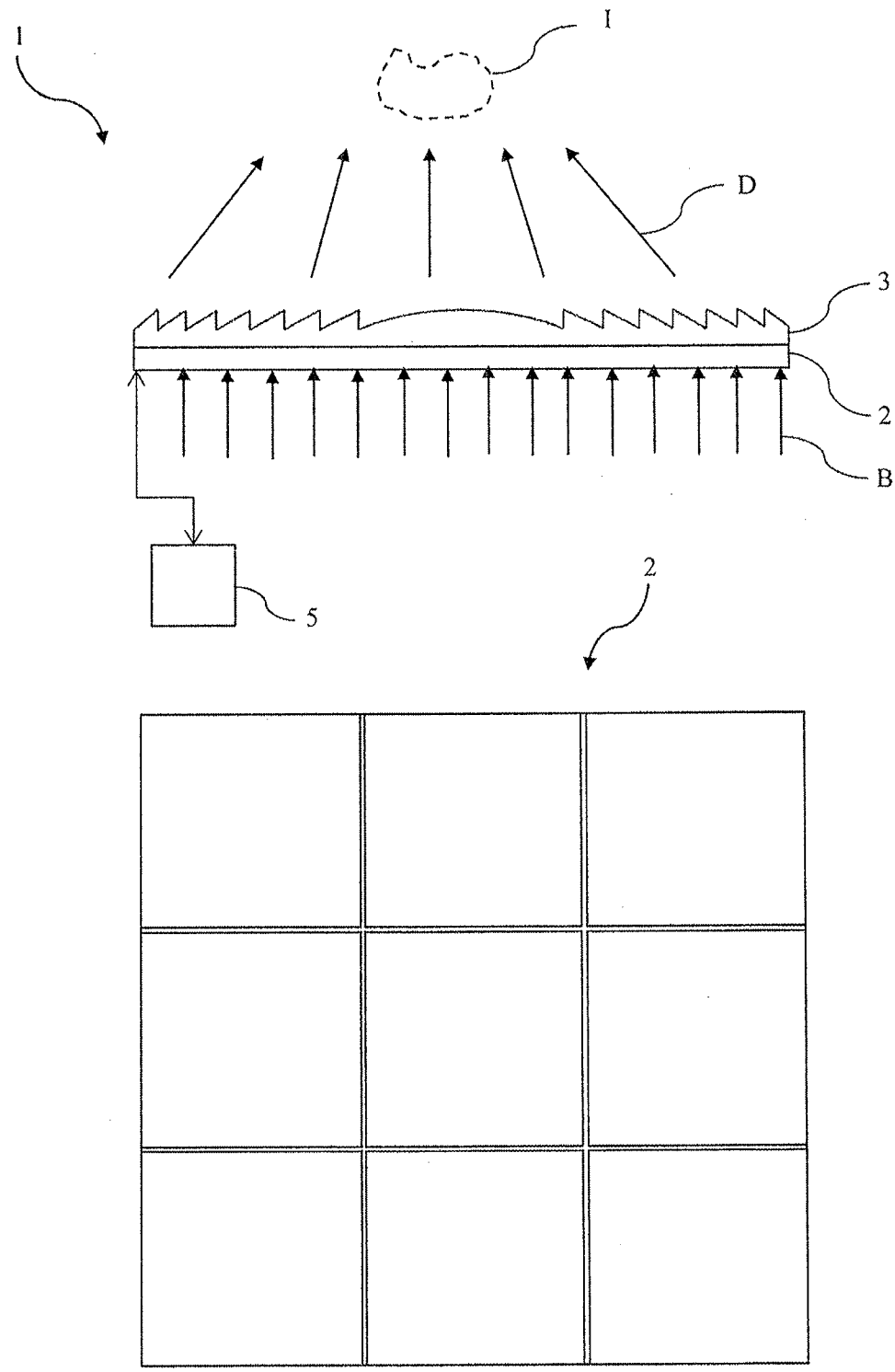

Elements shown in the figures are numbered as follows:
1. System
2. Spatial light modulator
3. Phase plate
4. Electro-optical capturing device
5. Computer
100. Method
B. Incident beam
D. Diffracted beam
I. True 3D image
T. Target object A system (1) which operates as wide viewing angle holographic display comprises;
  at least one light source for providing source light beam,
  at least one spatial light modulator (2) optically coupled to a light source, the spatial light modulator (2) comprising one or more fringe patterns and configured to diffract light from the light source that is incident upon the spatial light modulator (2),
  at least one phase plate (3) optically coupled to the spatial light modulator (2), the phase plate (3) configured to further diffract the beam (D) to or from the spatial light modulator (2).
  at least one computer (5) which controls the spatial light modulator (2) by generating and processing electronic driving signals and transmitting signals to spatial light modulator (2).

"Spatial light modulator (2)" or "SLM (2)" refers to devices known to those of ordinary skill in the art that modulate an incident light beam (B). The system (1) is configured to produce a true 3D image (I) about a focal point of the phase plate (3), in an embodiment of the invention.

FIG. 1 is a schematic diagram depicting the system (1) for holographic true 3D display model. A collimated coherent light beam from a light source uniformly illuminates the electronically driven large-area but rather low-resolution planar spatial light modulator (2). The direction of illumination (incidence angle of the illuminating beam) is perpendicular to SLM (2) surface, and therefore, the phase of the incident beam (B) over the SLM (2) is uniform.

SLM (2) is an element controlled by a computer (5); that means electronic driving signals are generated by computer (5) and transmitted to the SLM (2). Computer (5) is any electronic circuit, such as a digital signal processor, that has the ability to generate and process electronic driving signals and transmitting the signals to SLM (2).

Computer (5) is the device, which conducts the procedures for determining the optical fringe pattern to be written on SLM (2) and writing the pattern to SLM (2).

SLM (2) is either a reflective spatial light modulator or a transmissive spatial light modulator. This simple geometry shown in FIG. 1 includes the transmissive SLM (2) while the FIG. 2 includes the reflective SLM (2).

In the preferred embodiment of the invention, the SLM (2) alters both the amplitude and the phase of the incident light independently at every point on its planar surface as the light beam (B) passes through (for transmissive SLM (2)) or reflects from (for reflective SLM (2)) it, as controlled by the electronic driving signals generated by computer (5) and transmitted from the computer (5) to the SLM (2). In an embodiment of the invention, SLM (2) at its each surface point modulates at least one of the magnitude or phase of the incident light beam (B). The modulated light continues to travel towards a phase plate (3) either mounted directly on top of the SLM (2) or placed at a distance from the SLM (2). In another embodiment of the invention, the order of SLM (2) and the phase plate (3) is reversed so that the collimated light first passes through the phase plate and then through the SLM (2) to form the ghost-like 3D image around the focal point of the phase plate (3). In different embodiments of the invention the specific phase pattern over the phase plate may be a phase diffraction pattern associated with parabolic, spherical or ellipsoid profiles. Yet in other embodiments, the illuminating beam is not a collimated beam, but a converging beam.

The choice of the volume around the focal point for the resultant true 3D image (I) is directly related to the technical merits of this disclosed invention: For the paraboloid phase pattern, which is also called a Fresnel lens, or a quadratic phase pattern of the phase plate (3), if the SLM (2) does not at all modulate the incoming light, in other words if the incident uniform beam (B) (constant phase throughout the SLM (2) surface) passes through the SLM (2) unaltered, the result will be a sharp bright spot at the focal point of the phase plate (3), which is a Fresnel lens in this embodiment of the invention. By writing fringes on the SLM (2) to diffract the light, it is possible to move this bright spot around the focal point; rather slow varying fringes (low spatial frequencies) move the bright spot a little around the focal point, whereas, faster varying fringes (high spatial frequency) are needed for larger deviations from the focal point. Therefore, the need to write high-frequency fringes on the SLM (2) is avoided by restricting the resultant true 3D image (I) around the focal point. Video operation is achieved by writing a time-varying diffraction pattern on the SLM (2).

The phase plate (3) is a device typically made up of a material whose refractive index is different from the refractive index of the free space. Possible materials are glass or plastic. It is desirable to make the discontinuities (jumps) of the phase plate (3) equal to an integer multiple of $2\pi/\lambda$, where $\lambda$ is the wavelength in the material of the phase plate (3) of the monochromatic light that will be used during the operation of the system (1) as the display.

Figure 2:
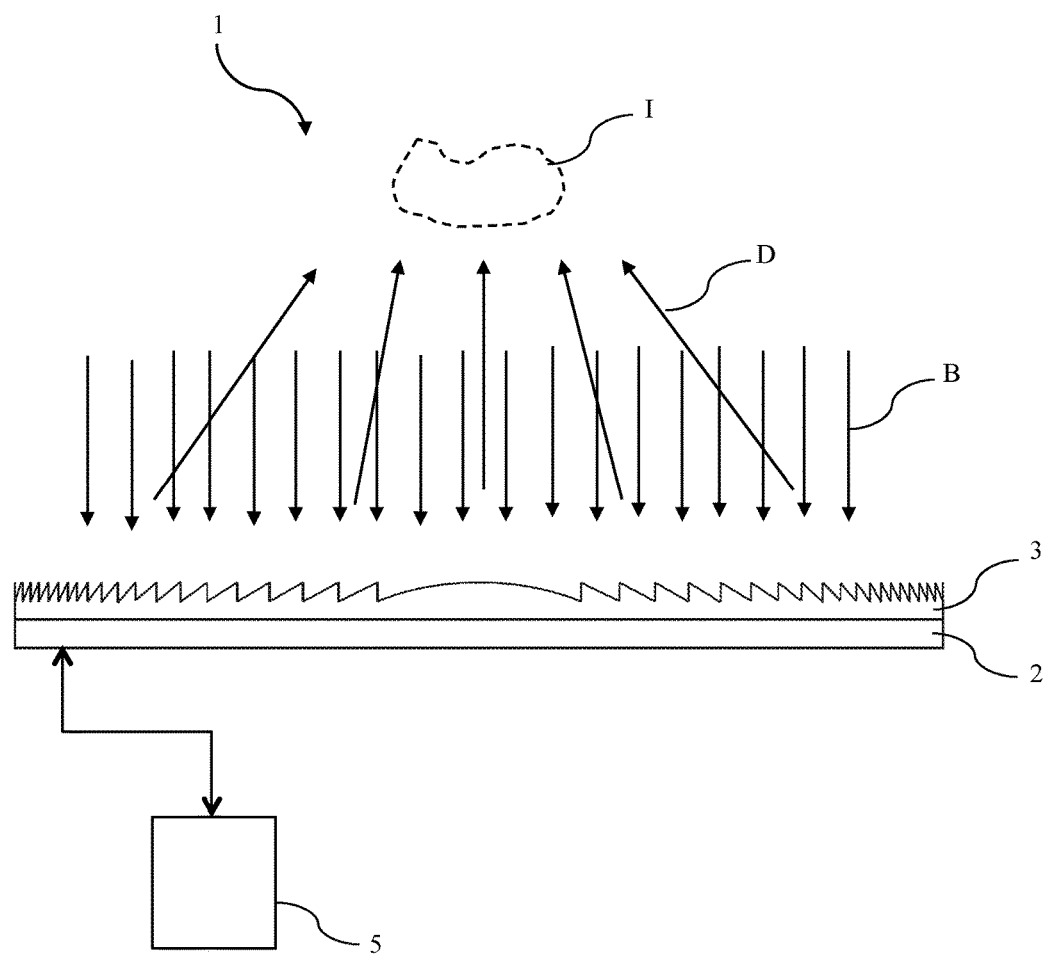

FIG. 2 is a schematic diagram depicting the system (1) for holographic true 3D display model, with a reflective SLM (2). In the reflective SLM (2) case, incident light beam (B) passes through the phase plate (3) first and reaches the SLM (2). The reflected beam (D) from the surface of the SLM (2) then passes through the same phase plate to form the ghost-like 3D image.

Even small maximum diffraction angles by the SLM (2) due to its low spatial resolution still yield a large and high quality optical viewing as a consequence of this invention. A simple analysis can be performed where the SLM (2) is a transmissive one and phase plate (3) has a quadratic phase pattern, i.e., a Fresnel lens. Each hypothetical local patch on the SLM (2) can diffract the light at most by a small angle (plus minus alpha) and therefore the outgoing light cone has a small footprint on the phase plate (3) surface. The undiffracted component of the outgoing beam (that is, the component that goes out from the SLM (2) perpendicularly along the axis) is diffracted towards the focal point of the phase plate (3). This is true for each different patch location on the SLM (2). The narrow cone, which represents the geometric limits of the diffracted beam (D) out from an SLM (2) patch, passes through the focal point of the phase plate (3), spanning a quite limited solid angle around the focal point. However, light components coming from small patches on different parts of the SLM (2) reach the surface of the phase plate (3) at different locations, and therefore, continue toward the focal point from different angles. The collection of such cones, each coming from a different hypothetical patch on the SLM (2) surface simultaneously, represents a concentration of light around the focal point of the phase plate (3), which is a Fresnel lens in this embodiment of the invention. Holographic operation, and therefore a 3D true display is achieved, when that light which continues to propagate to the 3D space after being concentrated around the focal point as described is a duplicate of the light that would come directly from a physical 3D object located around the focal point. Even though the SLM (2) is low resolution, and therefore, the light cone as depicted in the pictures is narrow, the collection of all such cones from the entire surface of the SLM (2) yields a true 3D image (I) which can be viewed from a much wider angle; the typical viewing angle for the configurations depicted in FIGS. 1 and 2 is 360 degrees along the lateral direction (around the axis of the depicted system (1); azimuth). The vertical angle is also large; the size of the vertical viewing angle depends on the size of the phase plate (3) and the SLM (2). A consequence of the proposed geometry is a high quality true 3D image (I) whose resolution is easily in the order of current 2D monitors, and can be viewed from any horizontal direction (360 degrees) within a wide vertical viewing angle. The only drawback could be the rather small size of the resultant true 3D image (I) compared to the physical extent of the SLM (2) and the phase plate (3). The result is a high-resolution, large viewing angle, ghost-like true 3D video display, even if the SLM (2) is low-resolution.

In an embodiment of the invention, light source may emit light which includes a plurality of colors and the system (1) is configured for color operation in a time sequential manner or the SLM (2) includes color masked pixels.

In an embodiment of the invention, SLM (2) comprises an array of smaller size spatial light modulators.

In different embodiments of the invention, geometric shape of the SLM (2) is a plane.

Figure 3A:
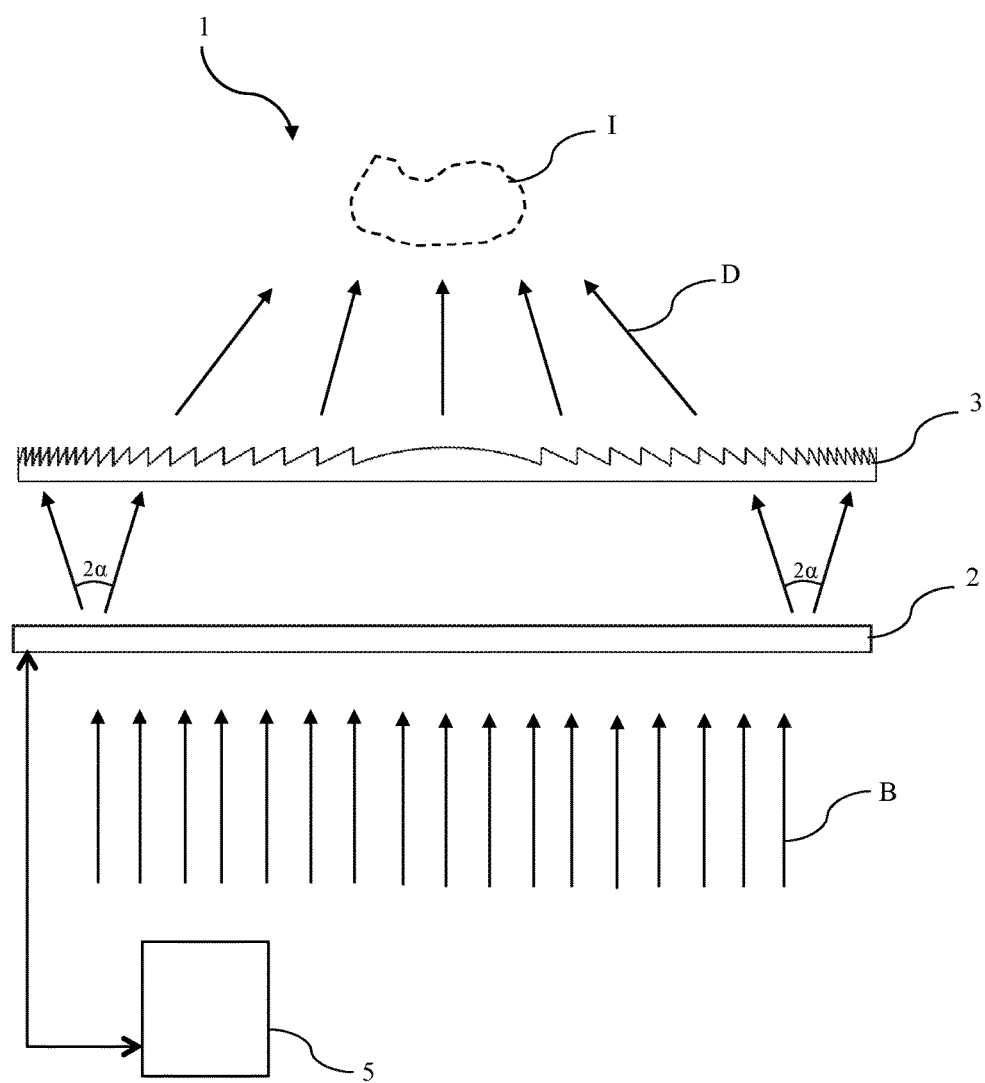
Figure 3B:
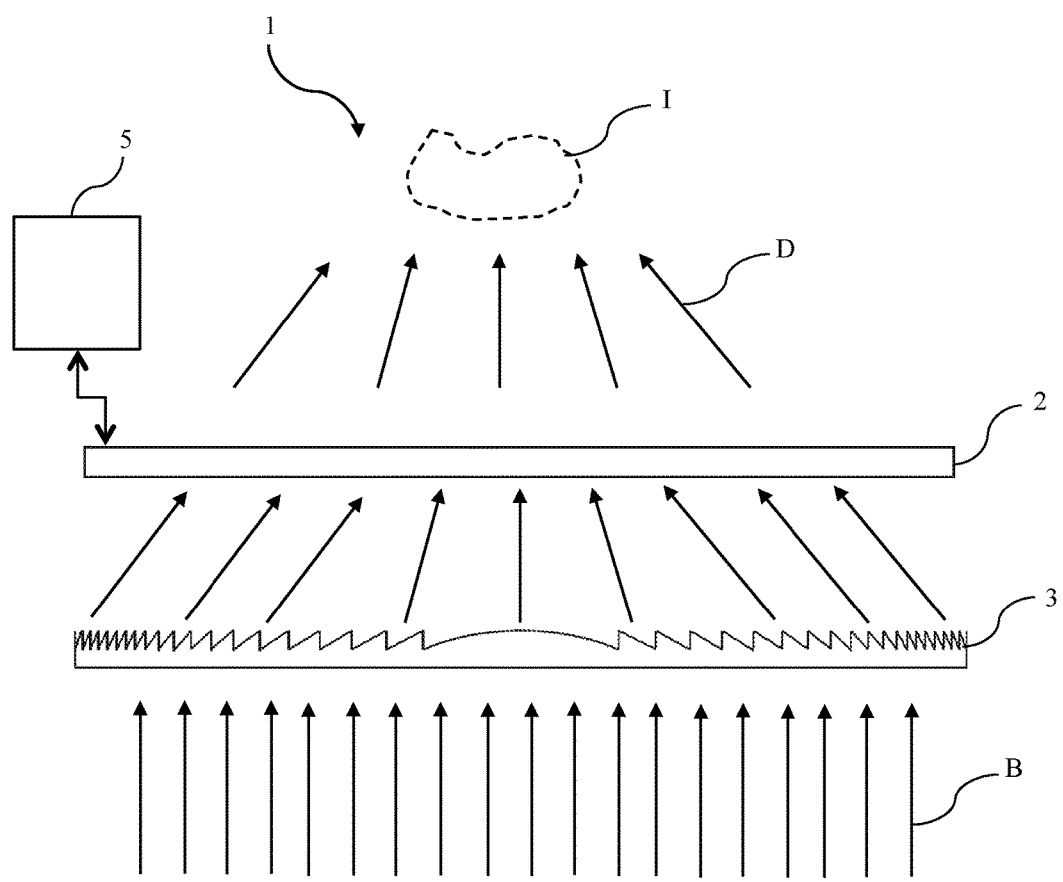

In an embodiment of the invention, spatial light modulator (2) and phase plate (3) might be placed in a way that these two layers do not touch each other. FIG. 3a and FIG. 3b are the schematic diagrams depicting this embodiment of the invention.

A system (1) which operates as wide viewing angle holographic camera comprises;
- at least one phase plate (3)
- at least one electro-optical capturing device (4) optically coupled to the phase plate (3), that can record spatio-temporal fringe-patterns formed by the incident coherent light,
- at least one computer (5) which receives signals captured by electro optical capturing device (4) and generates and processes corresponding electronic signals.

Figure 4A:
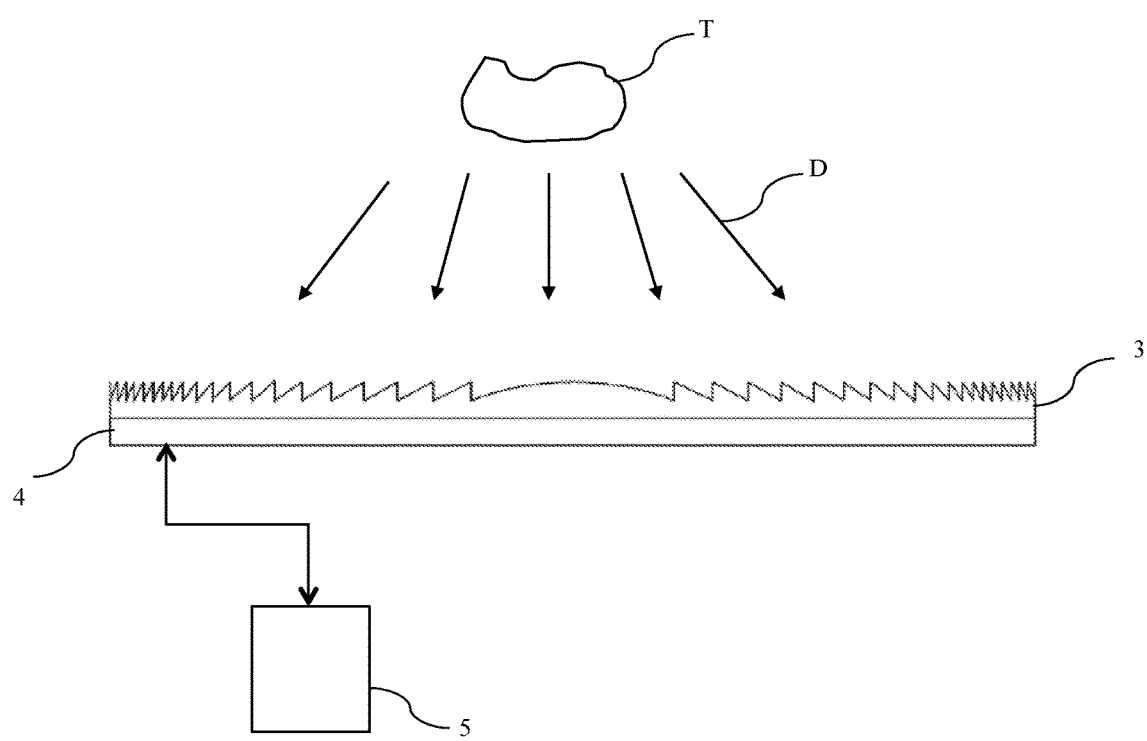
FIG. 4a shows the side view of a holographic true 3D camera in accordance with an embodiment of the invention wherein phase plate and electro-optical capturing device are included and placed adjacently.
Figure 4B:
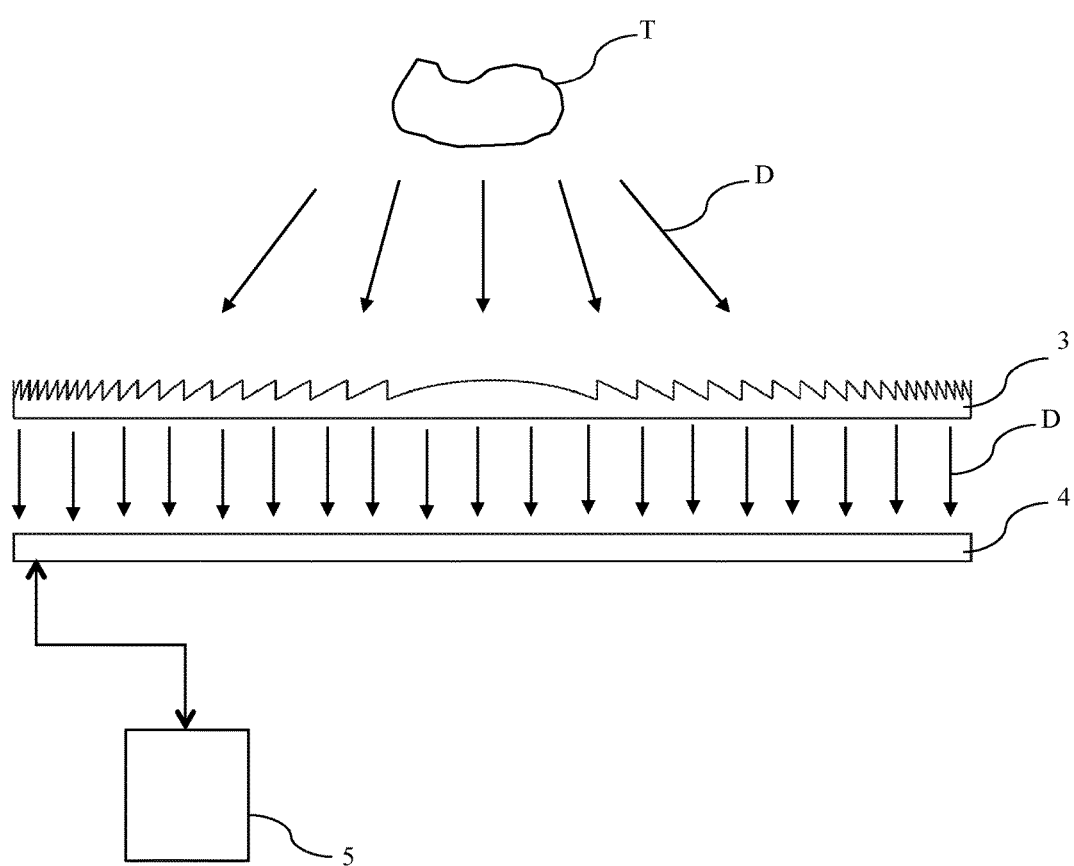
FIG. 4b shows the side view of a holographic true 3D camera in accordance with an embodiment of the invention where phase plate and electro-optical capturing device do not touch each other and there is a separation between these two layers.

FIG. 4a and FIG. 4b are the schematic diagrams depicting the system (1) for holographic true 3D video camera model. The operation of this model is similar to holographic true 3D display model of the system (1), but the optical paths of the light beams are reversed.

In an embodiment of the invention, the system (1) that is in true 3D video camera mode in FIG. 4a and FIG. 4b, receives light from a target object (T) that is located approximately at the focal point of the phase plate (3) in a typical application. The incident light from the target object (T) propagates first to the phase plate (3) surface, and then towards the electro-optical capturing device (4). The spatiotemporal (as a consequence of the motion of the object) fringe patterns at the electro-optical capturing device (4) are the captured holographic video signals. Computer (5) receives said signals from electro-optical capturing device (4) and generates corresponding electronic signals.

In different embodiments of the invention, the phase plate (3) forms a paraboloid, ellipsoid or spherical phase profile.

Computer (5) is any electronic circuit, such as a digital signal processor, that has the ability of receiving signals from electro-optical capturing device (4) and processing these received signals.

In the preferred embodiment, the phase plates (3) are the same both for the holographic true 3D display and video camera models of the invention. The phase plate (3) has a surface profile corresponding to a paraboloid, ellipsoid or spherical phase plate (3) in the holographic true 3D video camera model of the invention. The SLM (2) at the display model and the electro-optical capturing device (4) at the video camera models have the same geometric structure in terms of the size and the number of pixels. Electro-optical capturing device (4) is configured to capture at least one of phase information or magnitude information of the spatio-temporal fringe patterns of the incident light onto it from the object (D).

In an embodiment of the invention, electro-optical capturing device (4) comprises an array of smaller size electro-optical capturing devices.

In an embodiment of the invention, mismatches during the capturing process for holographic true 3D video camera model can also be handled by processing the captured signals by conversion algorithms running on computer (5). In preferred embodiment of the invention, the electro-optical capturing device (4) captures both the magnitude and the phase of the incoming light from a target object (T). If both the magnitude and the phase of the incoming light from a target object (T) can not be captured by the electro-optical capturing device (4) because of its physical limitations, any other holographic capture method in the state of the art, for example, the one in E. Stoykova, A. A. Alatan, P. Benzie, N. Grammalidis, S. Malassiotis, J. Ostermann, S. Piekh, V. Sainov, C. Theobalt, T. Thevar 5 and X. Zabulis, "3-D Time-Varying Scene Capture Technologies—A Survey", IEEE Tr. on CSVT, no 11, vol 17, pp 1568-1586, November 2007 may be employed.

In an embodiment of the invention, the coherent light source includes a plurality of colors and system (1) is configured for color operation in a time-sequential manner or electro-optical capturing device (4) includes color-masked pixels.

In an embodiment of the invention, the system (1) which operates as holographic true 3D display further comprises an opaque mask which is placed right at the focal point of the phase plate (3).

Although the invention discloses a system (1) which defines a holographic true 3D video camera model, capturing is not essential before displaying true 3D images (I) and videos. It is also possible to display computationally generated holographically displayed true 3D videos in an embodiment of the invention. Furthermore, in an embodiment of the invention, it is possible to blend captured scenes by such computationally generated synthetic objects and scenes, again by computational means.

A method (100) for computing fringe patterns on a spatial light modulator (2) for the transmissive case comprises the steps of:
 determining light propagation in space from at least one of a target object (T) located at a focal point of a phase plate (3) of the holographic true 3D display and the front surface of the phase plate (3) (101),
 determining the transmission of the propagated light from the front surface to the rear surface of the phase plate (3) (102),
 determining propagation of the diffracted light from the rear surface of the phase plate (3) to the surface of the spatial light modulator (2) to obtain optical fringe pattern information at the surface of the spatial light modulator (2) (103),
 writing the optical fringe pattern information onto the spatial light modulator (2)(104).

When the pattern written on the SLM (2) as outlined above is illuminated, the steps outlined above will be effective in the reverse direction, and since the light propagation is reciprocal, the result will be a ghost-like 3D image of the original object, as a consequence of the duplicated light field.

In case of a reflective SLM (2), the light passes through the diffractive phase plate (3) twice, and therefore, this should also be considered in the computational procedure outlined above.

Another procedure is to use a point-cloud representation for the object/scene to be generated, and then compute the field to be written on the SLM (2) to generate a single point of the object, by using computer (5). Depending on the position of the point, the form of the SLM (2) pattern will be different, but each such pattern can be computed. Finally, the superposition of all such SLM (2) pattern components will yield the fringe pattern on the SLM (2) that will generate the 3D point-cloud object/scene. These procedures are possible even for arbitrary surface profile phase plates (3); in case of practical surface profiles like a paraboloid, spherical or elliptical phase profiles, solutions are easier and analytical solutions can be found.

It can be analytically shown that even if the SLM (2) can only diffract the incident light (B) on it at quite small angles, the resultant true 3D image (1) is high quality and visible from a wide range of angles, within the invention. Therefore, a quite feasible SLM (2) can be achieved by using commercially available LCD panels used in commercial LCD displays, in an embodiment of the invention. A possibility is to manufacture a single LCD display panel to match the geometric shape of the base. Another alternative is to construct the SLM (2) using commonly available existing rectangular LCD panels. Transmissive panels as well as reflective panels, for example based on liquid crystal on silicon (LCoS) technology, can be used. For example, if it is desired to construct the SLM (2) using commercially available common LCD television or other mobile electronic device display panels, even a reverse engineering is possible by removing the back illumination in those commercial displays and by directly illuminating the LCD panel by a collimated plane wave. Many such rectangular panels are needed to cover, and thus obtain, the SLM (2) surface in this holographic 3D display design. High-end commercial LCD panels, in terms of their pixel count (more pixels are desirable), and in terms of their pixel size (smaller pixel sizes are desirable) are needed for better performances. Such a design example corresponds to magnitude-only transmissive SLM (2) modulation. LCoS or similar reflective versions are more suitable for phase-only operation.

Different geometric variants in different embodiments of the invention are all feasible: the order of the phase plate (3) and the SLMs (2) can be altered. More than one phase plate (3) layers can be used in tandem. The illuminating light from the light source may be converging or a diverging beam instead of a collimated beam. The phase plates (3) may generate converging beams to yield real ghost-like 3D images in front of them, or generate diverging beams to generate virtual ghost-like 3D images at the back side of the phase plates (3).

Color true 3D camera and display operations of the system (1), based on the disclosed principles in this invention, is also possible. As commonly used in projection systems, a possible color operation during the display is achieved by illuminating the SLMs (2) in a time sequential manner by different color light sources, frame-by-frame, for example, by red, green and blue lasers. As consecutive colors are used at a rate faster than the human eye can detect the discontinuities (for example, at a rate of 25 full-color frames per second, which is equivalent to 75 single color frames per second), a continuously perceived color operation is achieved.

Time sequential color operation is a well-known color display technology used also in 2D systems. Within this operation, appropriate element (SLM (2) or electro-optical capturing device (4)) of the system (1) is simply illuminated in a time-sequential manner by different main colors, one after another. In an exemplary embodiment of the inventive system (1) which operates as a holographic true 3D display, first the fringe pattern corresponding to the "red" 3D image (I) is written on the SLM (2) and the SLM (2) is illuminated by the "red" light from light source; afterwards, the fringe pattern for the "green" 3D image (I) is written on the SLM (2) and it is illuminated by the "green" light from light source; 25 and finally the fringe pattern for the "blue" 3D image (I) is written and illuminated by the "blue" light from the light source. This operation is repeated in a continuous fashion. Other main colors and other sequences of colors are also possible. The repetition rates are fast as mentioned above, so that the human eye cannot resolve individual single color projections, but sees a color operation. Possible chromatic aberrations during above mentioned time-sequential operation are handled by generating the fringe patterns on the SLM (2) accordingly, for each color. The needed adjustments and modifications for each color is automatically handled by a matching camera-display pair; or, in case of mismatches where there is a correction step between the camera and the display, the corrections must be made by taking each color component properties into consideration. In case of computer-generated input to the display, again, such color specific adjustments must be made.

An alternative color operation is achieved by using permanent different color masks in front (or back) of each pixel of the SLMs (2), and by illuminating the SLMs (2) simultaneously by many colored light sources, as in many conventional LCD panels used in TV sets. If the color filters are narrow-band in their color spectra, a sufficient coherence for holographic operation at the outgoing light field may still be achieved. However, this method will result in a significant waste of light energy. In such a color operation, the discontinuities (jumps) of the phase plate (3) must be integer multiples simultaneously of each $2\pi/\lambda_i$, where $\lambda_i$ is the wavelength in the material of the phase plate (3), of each of the many monochromatic light components that are used during the parallel color illumination.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A system which operates as a holographic true 3D display comprising;
   at least one spatial light modulator (2) where a time-varying fringe is written on the spatial light modulator (2),
   at least one phase plate (3) with a permanent phase plate profile on it where the plate covers the surface of the spatial light modulator (2),
   at least one light source (B) that illuminates the spatial light modulator (2) and the phase plate (3) to produce a diffracted light (D) that forms the holographic 3D image (I);
   at least one computer (5) which controls the spatial light modulator (2) calculates the fringe patterns to be written on the spatial light modulator (3) and writes the fringe patterns onto the spatial light modulator.

2. The system (1) according to claim 1, wherein the spatial light modulator (2) is either a reflective spatial light modulator or a transmissive spatial light modulator.

3. The system (1) according to claim 2, wherein the spatial light modulator (2) modulates at least one of the magnitude or phase of the light from light source.

4. The system (1) according to claim 1, wherein the spatial light modulator (2) includes color-masked pixels.

5. The system (1) according to claim 1, wherein the spatial light modulator (2) is illuminated in a time sequential manner by different color light.

6. The system (1) according to claim 5, where the fringe patterns on the spatial light modulator (2) are modified for each component of the light to correct chromatic color aberrations on the displayed holographic 3D image that might occur during time-sequential operation.

7. The system (1) according to claim 1, wherein the spatial light modulator (2) comprises an array of smaller size spatial light modulators.

8. The system (1) according to claim 1, wherein the spatial light modulator (2) has a geometric shape of a plane.

9. The system (1) according to claim 1, wherein the computer (5) calculates the fringe pattern to be written on the spatial light modulator (2) and writes said pattern the spatial light modulator (2).

10. The system (1) according to claim 1 comprising an opaque mask which is placed right at the focal point of the phase plate (3).

11. The system (1) according to claim 1, wherein the permanent phase pattern on the phase plate (3) forms a paraboloid, ellipsoid or spherical phase profile.

* * * * *